United States Patent [19]

Horsting

[11] 4,267,766
[45] May 19, 1981

[54] CONTROL VALVE APPARATUS FOR A PNEUMATICALLY OPERATED SERVOMOTOR

[75] Inventor: John J. Horsting, South Bend, Ind.

[73] Assignee: The Bendix Corporation, Southfield, Mich.

[21] Appl. No.: 6,989

[22] Filed: Jan. 29, 1979

[51] Int. Cl.³ .............................................. F15B 9/10
[52] U.S. Cl. .................................... 91/369 A; 251/7; 137/627.5
[58] Field of Search ............. 91/369 A, 369 R, 369 B; 251/7; 137/627.5

[56] References Cited

U.S. PATENT DOCUMENTS

| 2,197,995 | 4/1940 | Crowley | 251/7 |
|---|---|---|---|
| 3,044,449 | 7/1962 | Price | 91/369 A |
| 3,149,539 | 9/1964 | Prather | 91/369 A |
| 3,172,334 | 3/1965 | Wuellner et al. | 91/369 A |
| 4,117,769 | 10/1978 | Carre et al. | 91/369 A |

Primary Examiner—Paul E. Maslousky

Attorney, Agent, or Firm—Leo H. McCormick, Jr.; Ken C. Decker

[57] ABSTRACT

A control valve for a servomotor having a disc located in a bore of a hub attached to a movable wall. The movable wall separates a first chamber from a second chamber. A passage in the disc connects a first passageway with a second passageway in the hub to define a flow path to allow free communication of a first fluid between the first and second chambers. A plunger located in the bore has a first end with an axial projection extending therefrom which engages the disc and a second end connected to an input push rod. An input force applied to the push rod moves the plunger which causes the axial projection to deform the disc and interrupt the flow path between the first and second chambers. Thereafter, further movement of the plunger allows a second fluid to be communicated to the second chamber whereby a pressure differential is created across the wall by the first and second fluids. The pressure acting on the wall creates a force which moves the wall and provides an output member with an operational force.

13 Claims, 4 Drawing Figures

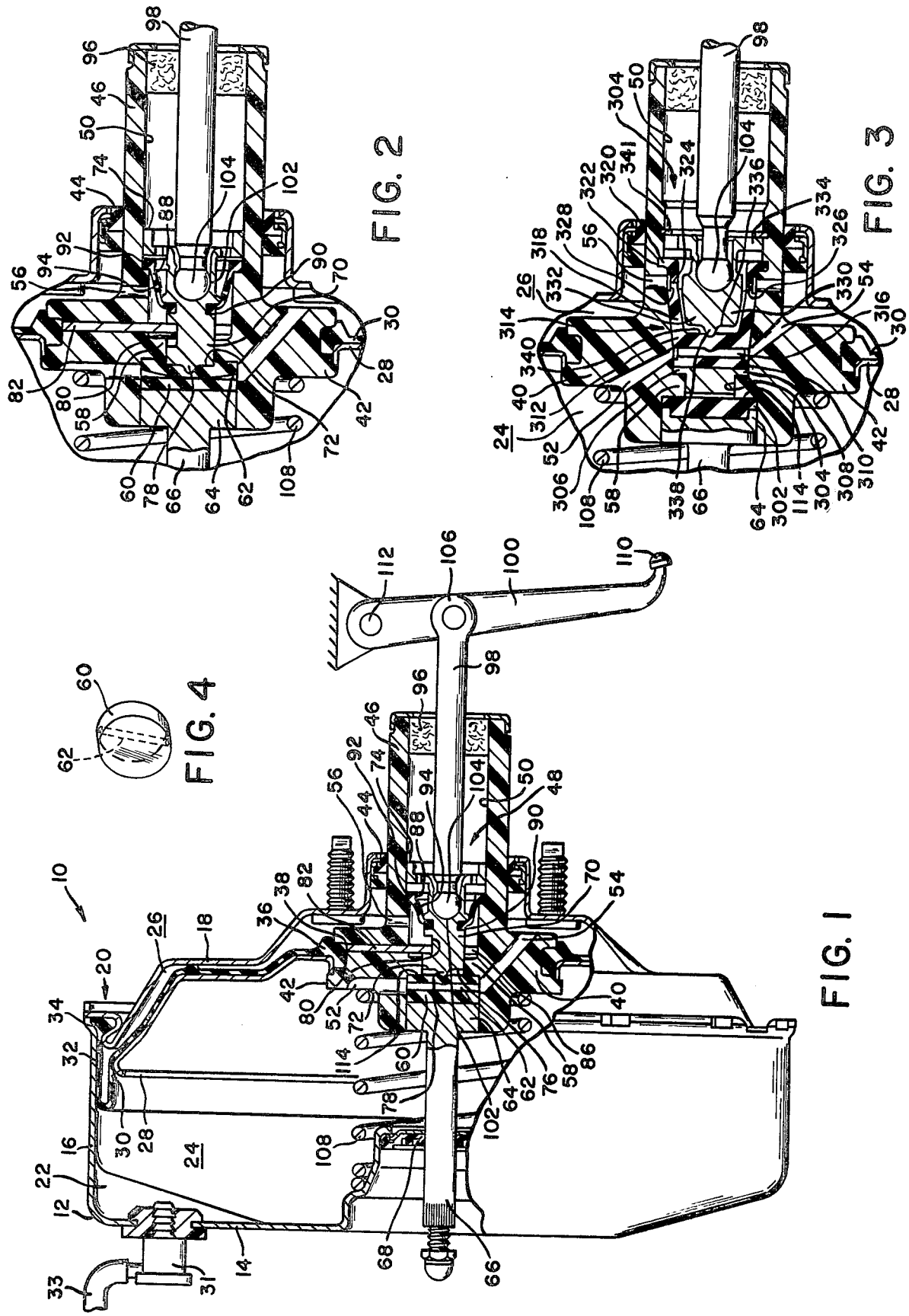

CONTROL VALVE APPARATUS FOR A PNEUMATICALLY OPERATED SERVOMOTOR

BACKGROUND OF THE INVENTION

This invention relates to a control valve arrangement for a servomotor which provides a power assist to an operator input to effect a brake application in a vehicle. Such servomotors usually derive power through the creation of a force developed across a movable wall by a pressure differential between a partial vacuum on one side of the wall and air at atmospheric pressure on the other side. Air is presented to the wall through the movement of a valve, such as the poppet valve shown in U.S. Pat. No. 3,289,547 or the slide valve shown in U.S. Pat. No. 3,106,873, in a bore of a hub member in response to an operator input.

Poppet valves require seats for both vacuum and air passages to be established on the housing of the hub to assure that partial vacuum and air presented to the wall are independent of each other when an input force is applied to the plunger to effect a brake application.

While the slide valve eliminates a seat on the hub, a seat is still required on the plunger which engages a resilient disc to regulate the communication of air to the wall.

Unfortunately, in both the poppet valve and the slide valve, the seating surfaces on the housing of the hub requires machining which adds to the production costs of the servomotor. If the seating surfaces are not substantially smooth, as leak path can occur whereby air can be presented to the wall to create a pressure differential in the absence of an input force or to both sides of the wall and thereby eliminate or greatly reduce the development of the pressure differential in response to an input force.

SUMMARY OF THE INVENTION

I have devised a control mechanism having flexible seating surfaces to reduce the possibility of the creating of leak paths which can inhibit the development of the optimum pressure differential across a wall in a pneumatically operated servomotor.

The control mechanism includes an elastomeric disc having a passage therein to provide a flow path for communicating a fluid to both sides of the wall, a plunger having a cylindrical body with an axial projection which engages the elastomeric disc, and a resilient sleeve having a series of slits therein.

In the rest position for the servomotor, a first fluid is freely communicated through the passage to allow the wall to remain stationary.

On the operation of the servomotor by an operator, an input force is applied to move the plunger. When the plunger moves, the axial projection of the cylindrical body deforms the elastomeric disc to interrupt the flow communication through the passage. At the same time, the resilient sleeve is expanded to open the slits and allow a second fluid to flow to one side of the wall and create a pressure differential across the wall with the first fluid on the other side. This pressure differential acts on the wall to develop an output force which is transmitted through the disc to provide an output member with an operational force. The resistance to movement of a mechanism by the output member is carried back through the elastomeric disc into the plunger to provide an operator with an indication of the operational force being transmitted to a mechanism. At the same time, this resistance also acts on the elastomeric disc to maintain the deformation of the passage and assure that the passage is sealed to prevent any intermingling of the first or second fluids during a brake application.

It is therefore an object of this invention to provide a servomotor with a control apparatus having flexible seating surfaces to reduce the possibility of leak paths when fluids of different pressures are presented to opposite sides of a movable wall.

It is another object of this invention to provide a servomotor with a reaction disc member having a passage therethrough, the deformation thereof controlling the communication of fluid between first and second chambers in a servomotor.

It is another object of this invention to provide a control valve with an elastomeric disc having a passage therethrough for communicating a first fluid between a first chamber with a second chamber, a resilient sleeve having slits therein and a plunger having a projection that engages the elastomeric disc. The plunger moves in response to an operator to simultaneously urge the projection into the elastomeric disc and deform the passage to interrupt the communication of the first fluid to the second chamber and to expand the sleeve to open the slits and allow a second fluid to be communicated to the second chamber. Thereafter, the first fluid in the first chamber and the second fluid in the second chamber create a pressure differential which acts on a wall to develop an output force corresponds to the input force.

These and other objects should be apparent from reading this specification and viewing the drawing.

BRIEF DESCRIPTION OF THE DRAWINGS

FIG. 1 is a schematic illustration of a servomotor having a control valve mechanism made according to the principles of this invention;

FIG. 2 is a sectional view of the control valve mechanism of FIG. 1 in an activated position;

FIG. 3 is a sectional view of another embodiment of the control valve mechanism of FIG. 1; and FIG. 4 is a perspective view of the reaction disc of the control valve mechanism shown in FIG. 1.

DETAILED DESCRIPTION OF THE INVENTION

The fluid pressure servomotor 10 shown in FIG. 1 has a front shell 12 with a closed end 14 from which an annular wall section 16 extends rearwardly. The front shell 12 is joined to a rear shell 18 through a closure member 20 of the type disclosed in U.S. Pat. No. 3,977,299 to form a sealed cavity 22. The sealed cavity 22 is divided into a vacuum chamber 24 and a control chamber 26 by wall member 28 and diaphragm member 30 of the type disclosed in U.S. Pat. No. 3,958,497. The vacuum chamber 24 is connected through check valve 31 and conduit 33 to a source of vacuum, usually the intake manifold of a vehicle. The diaphragm member 30 has a rollable section 32 with a bead 34 on the end thereof retained by the closure member 20 and an internal lip 36 which snaps into a groove 38 on hub 40 to hold the wall member 28 against shoulder 42.

The hub 40 has a cylindrical body 46 that extends through an opening 44 in the rear shell 18. The cylindrical body 46 has a stepped bore 50 which extends through the entire hub 40. The stepped bore 50 is connected to the vacuum or first chamber 24 through a first passage 52 and to the control or second chamber 26 by second and third passages 54 and 56. A land 58 in the hub 40 which separates the first 52 and second passages 54 from the third passage 56 provides a stop for a reaction disc 60 located in the stepped bore 50.

The reaction disc 60 has a diametrical passageway 62, see FIG. 4, which connects the first passage 52 with the second passage 54 to define a flow path between the vacuum chamber 24 and the control chamber 26. The head 64 of the output push rod 66 which is located in the stepped bore 50 abuts the reaction disc 60 and extends through opening 68 in the front shell 12.

Thereafter an input force moves a control valve arrangement 48 to develop an operational force in the servomotor 10 which is transmitted through the output push rod 66 to a master cylinder (not shown) to effect a brake application.

In more particular detail, the valve arrangement 48 includes the reaction disc 60, a plunger 70 and a diaphragm 88.

The plunger 70 which is located in bore 50 has a cylindrical body with a first end 72 and a second end 74. The first end 72 has a relative flat section 76 and an elevated section 78 that projects from the flat section 76. A key 82 which is located in a keyway 84 in hub 40 has a forked end which extends into the stepped bore 50. One leg 86 of the forked end is located on one side of the cylindrical body and another leg (not shown) is located on the other side. The legs are separated by a flat section which extends into a slot 80 on the cylindrical body of plunger 70. The bead 36 holds the key 82 in slot 80 to assure that the elevated section or projection 78 from end 70 is aligned in a plane which is substantially 90° to the passageway 62 in the reaction disc 60.

A diaphragm 88 has a sleeve section with a first bead 90 fixed in a groove on the cylindrical body of the plunger 70 and a second bead 92 fixed in a groove in the cylindrical body 46 of the hub 40. The diaphragm 88 has a series of slits 94 and 94' which are located in the sleeve section of the diaphragm 88. The diaphragm 88 is a rubber material and in the rest position shown in FIG. 1, the internal resiliency thereof holds the slits 94 together to prevent air present in bore 50 from being communicated to the second chamber 26.

The plunger 70 has a socket 102 for retaining ball 104 of push rod 98. Push rod 98 extends through a filter 96 attached to the hub 46. The filter 96 prevents any contaminents in the air from being communicated into bore 50. The push rod 98 is connected to brake pedal 100 through eye 106.

MODE OF OPERATION OF THE INVENTION

When an internal combustion engine is operating, vacuum is produced at the intake manifold. This vacuum is communicated through conduit 33 to evacuate air from the servomotor 10 shown in FIG. 1.

Any air present in chamber 26 flows to chamber 24, by way of passages 52 and 54 in the hub 40 and passageway 62 in the reaction disc 60, before passing through the one-way check valve 31 in conduit 33. A return spring 108 acts on hub 40 to urge the diaphragm 30 and wall 28 toward the rear shell 18 into the rest position as shown in FIG. 1.

When an operator desires to effect a brake application, an input force is applied to brake pad 110 whih causes the pedal 100 to pivot pin 112 and impart a linear input to push rod 98. This linear input moves plunger 70 toward land 72 in the hub 40.

As shown in FIG. 2, initial movement of plunger 70 causes the projection 78 to move into the elastomeric disc 60 and deform the passage 62. Deformation of the passage interrupts the flow of communication between the vacuum chamber 24 and the control chamber 26. When the second or flat section 76 on the plunger 70 engages the reaction disc 60, the deformed passage 62 should be completely sealed. Thereafter, the input force from the operator moves the plunger 70 into the reaction disc 60 causing the sleeve of the diaphragm 88 to expand and open slits 94. When slits 94 are opened, air in bore 50 is communicated into the second chamber 26 by way of passage 56.

With air in chamber 26 and vacuum in chamber 24, a pressure differential is created across diaphragm 30 and wall 28 to create an output force. This output force is transmitted from wall 28 into shoulder 42 for distribution to head 64 through the reaction disc 60 to move the output push rod 66. The resistance to movement of push rod 66 creates a reaction force which acts on the reaction disc 60 to compress the reaction disc 60 between head 64, the shoulder 114 of land 58 and the end 72 of plunger 70.

The reaction force acting on plunger 70 is carried back into the brake pedal 100 to provide the operator with an indication of the output force being developed in the servomotor 10. At the same time, the reaction force moves the plunger 70 sufficiently for the internal resiliency in the sleeve 88 to close the slits 94 and thereby match the pressure differential produced across the wall 28 and diaphragm 30 with the input force applied to pad 110.

When the input force applied to pad 110 by the operator terminates, projection 78 on the plunger 70 moves out of the elastomeric reaction disc 60 to re-establish flow communication between chambers 24 and 26. With the flow path between chambers 24 and 26 opened, vacuum in conduit 33 evacuates the air from the servomotor to eliminate the pressure differential across the wall 28 and diaphragm 30 and allow the return spring 108 to move the hub 40 to the rest position shown in FIG. 1.

In the embodiment shown in FIG. 3 wherein components are the same as in FIG. 1, they are identified by the same numeral.

The difference between the embodiments in FIG. 3 and FIG. 1 reside in construction of the control mechanism 304 through which the fluid for generating the pressure differential is presented to the control chamber 26.

The control mechanism 304 shown in FIG. 3, includes a resilient valve member 314 and a plunger 330. The resilient valve 314 has a solid reaction disc 302 which is located in the stepped bore 50 between head 64 on the output push rod 66 and shoulder 114 on land 58. A cylindrical reaction plug member 308 which is located on land 58 has an annular shoulder 306 that engages shoulder 300 in the stepped bore 50. The plug member 308 has a flat surface 310 which forms a base for a disc section 312 of the resilient valve member 314. The disc section 312 has a passage 316 therethrough which connects passage 52 with passage 54 in hub 40 to define a flow path between chambers 24 and 26.

The resilient valve member 314 has a sleeve 318 with is integrally formed with the disc section 312. A lip 320 on the end of sleeve 318 is located in groove 322 in the cylindrical body 46 of the hub 40. The sleeve 318 has a series of radial slits 324 and 326 that are located in a groove 328 connected to passage 56.

The plunger 330 has a cylindrical body with a bearing surface 334 that engages bore 50 and a contour surface 332 that is concentric to the sleeve 318. The cylindrical body has a flat surface 336 on the end thereof with a projection 338 that extends therefrom. A retainer 341 attached to the cylindrical body 48 of the hub 40, holds the plunger 330 in the bore 50 such that projection 338 extends into the disc 312.

When the control apparatus 304 for the servomotor shown in FIG. 3 receives an input force from push rod 98, plunger 330 moves in bore 50 causing surface 338 to deform the resilient disc 312 and interrupt communication through passage 316 between chambers 24 and 26. When surface 336 engages surface 340, passage 316 should be completely closed Thereafter any further movement of the plunger 330 by the input force causes the sleeve 332 to expand and open slits 324 to allow air to be communicated to chamber 26 through passage 56.

With air in chamber 26 and vacuum in chamber 24, a pressure differential is created across wall 28 and diaphragm 30. This pressure differential creates a force that is transmitted into shoulder 42 of the hub 40. This output force is carried through reaction disc 302 and into head 64 for moving the output push rod 66 to provide a master cylinder with an operational input force. The resistance to movement of the push rod 66 and the output force transmitted to the hub 40 causes the reaction disc 302 to be compressed while at the same time a portion of the reaction disc 302 flows into land 58 for engagement with plug member 308. The force acting on plug 308 is thereafter carried through disc 312 to provide an operator with an indication of the output force being transmitted from the servomotor through push rod 66.

On termination of the input force on push rod 98, the resiliency of disc 312 moves surface 336 away from surface 340 and projection 338 out of the passage 316 to commence fluid communication between chambers 24 and 26. With the flow path between chambers 24 and 26 opened, air is evacuated from the servomotor and the pressure differential eliminated across wall 28 and diaphragm 30 to allow return spring 108 to move the hub 40 against the rear shell 18 to the rest position.

I claim:

1. In a servomotor having a housing with a first chamber separated from a second chamber by a wall, said wall being moved by a pressure differential developed between a first fluid in the first chamber and a second fluid communicated to the second chamber, said pressure differential creating an output force in the wall in response to an input force to move an output member, the improvement comprising:

valve means including a first resilient member located in said wall adjacent said output member and a second resilient member with slits therein, said first resilient member having a first passage therethrough for connecting said first chamber with said second chamber, said first passage providing a first flow path through which the first fluid is communicated from the first chamber to sthe second chamber; and plunger means responsive to said input force for operating said valve means, said first resilient member being deformed by being compressed between said plunger means and output member by the input force acting on said plunger means and the resistance of the output member to movement by the output force to seal said first passage and interrupt communication of said first fluid to said second chamber and said second resilient member being expanded to thereafter allow said communication of said second fluid to the second chamber through said slits.

2. In the servomotor, as recited in claim 1, wherein said plunger means includes:

a cylindrical member having a first end and a second end, said first end having a first section projecting from a second section, said second end being connected to an input member, said input force being transmitted through said input member to move said cylindrical member causing said first section to extend into said first resilient member and substantially close said first passage prior to said second section engaging said first resilient member.

3. In the servomotor, as recited in claim 2 wherein said second resilient member has a first lip secured to the wall and a second lip secured to said cylindrical member, said second resilient member having a series of said slits located between said first lip and said second lip, said movement of the cylindrical member expanding said second resilient member and when said second section of the cylindrical member engages said first resilient member opening said slits to allow said second fluid to be communicated to said second chamber.

4. In the servomotor, as recited in claim 3 further including:

a key member secured to said wall and engaging said cylindrical member to maintain said first section on the first end in a plane substantially 90° to said first passage in said first resilient member to assure a complete interruption of communication which occurs between said first and second chambers.

5. In a servomotor having a housing with a cavity therein, a wall for separating the cavity into a first chamber and a second chamber, a hub attached to the wall, said hub having a projection which extends through an end wall of the housing, said hub having a bore therein communicating with the first chamber by a first passage and to the second chamber by second and third passages, an output member connected to the wall, a control member located in the bore of the hub, and an input member for moving the control member to interrupt the communication of a first fluid between the first and second chambers through the bore and initiate communication of a second fluid to the second chamber to create a pressure differential which moves the wall and provide the output member with an output force, the improvement in the control member comprising:

a resilient disc located in the bore and having a passageway therethrough for connecting said first passage with said second passage to define a flow path between the first and second chambers;

plunger means connected to said input member for engaging said resilient disc to close said flow path by deforming the resilient disc in response to an input force to interrupt fluid communication between said first and second chamber; and a resilient sleeve connected to the hub and said plunger means, said resilient sleeve having a plurality of slits therein, said slits opening to allow the second fluid to flow through the third passage to the second chamber on movement of the plunger means by the input member to thereafter allow said pressure differential to be created.

6. In the servomotor, as recited in claim 5 wherein said plunger means includes:

a cylindrical member having a first end with an axial projection extending therefrom and a second end, said axial projection engaging said resilient disc, said second end being secured to said input member, said axial projection extending into said resilient disc on movement of the cylindrical member by the input force to proportionally restrict the communication through the flow path as the resilient disc is deformed by being compressed between the first end and the output member.

7. In the servomotor, as recited in claim 6, wherein said resilient disc carries the output force which is supplied to the output member and a reaction force to the plunger to indicate the resistance of the output member to movement of the wall.

8. In the servomotor, as recited in claim 7, wherein said resilient sleeve has a flange thereon located in a groove in the hub and is connected to said resilient disc, said slits being located between the flange and the disc, said sleeve expanding as the first end of the cylindrical member engages the resilient disc to allow the second fluid to be communicated from the bore in the hub to the second chamber by way of the slits and third passage.

9. In a servomotor having a housing with a first chamber separated from a second chamber by a wall, said wall being moved by a pressure differential developed between a first fluid in the first chamber and a second fluid communicated to the second chamber, said pressure differential developing an output force in the wall in response to an input force to move an output member, the improvement comprising:

valve means having a resilient member with a cylindrical section connected to a lip section by a sleeve section, said cylindrical section having a first passage therethrough for connecting said first chamber with said second chamber to provide a flow path through which the first fluid is communicated from the first chamber to the second chamber, said sleeve section having a second passage therethrough connected to said second chamber, said lip section being attached to said wall;

means for connecting said cylindrical section of the valve means with said output member; and plunger means responsive to said input force for engaging and compressing said cylindrical section to sequentially close said first passage and interrupt communication of the first fluid to said second chamber while expanding said sleeve section to open said second passage and allow communication of said second fluid to the second chamber to create said pressure differential.

10. In the servomotor, as recited in claim 9 wherein said plunger means includes:

a cylindrical member having a first end and a second end, said first end having a first section projecting from a second section, said first section engaging said cylindrical section of the resilient member, said second section being connected to an input member, said input force being transmitted through said input member to move said cylindrical member causing said first section to extend into said cylindrical section and close said first passage and thereafter expand said cylindrical section when said first section engages said cylindrical section.

11. In a pneumatically operated servomotor having a housing with a first chamber separated from a second chamber by a movable wall assembly, said movable wall assembly being moved by a pressure differential developed between a first fluid under pressure in the first chamber and a second fluid under pressure communicated to the second chamber to develop an output force for moving an output member in response to an input force, said pressure differential being controlled by a valve device including a plunger member which is moved by said input force from a rest position where the first fluid from the first chamber is communicated to the second chamber through first passage means to an operational position where fluid communication from the first chamber to the second chamber is interrupted and the second chamber is connected to the second fluid through second passage means characterized in that said valve device further includes:

a first resilient member with a normally opened diametrical passage therethrough which is part of the first passage means, said first resilient member being compressible and then deforming itself to seal said normally opened diametrical passage when engaged by the plunger member in response to an input force; and a second resilient member with at least one normally closed passage therethrough which is part of the second passage means, said second resilient member being extensible and then deforming itself to open said normally closed passage when stretched by movement of the plunger member in response to said input force and allow communication of the second fluid to the second chamber.

12. In the pneumatically operated servomotor according to claim 11, wherein the movable wall assembly comprises:

a hub portion with a bore therewithin, said bore slidably receiving the plunger member of the valve device and a head on said output member, said bore communicating with the first and second chambers through conduits forming part of said first and second passage means, respectively.

13. In the pneumatically operated servomotor as recited in claim 12 wherein said first resilient member is a disc of resilient material with a normally opened passage therein aligned with passages in said hub, said disc being located between said plunger and output member, said plunger having a projection that is aligned in a plane substantially 90° from the normally opened passage, said projection moving into said disc to close said opened passage on movement of the plunger member.

* * * * *